Figure 1:
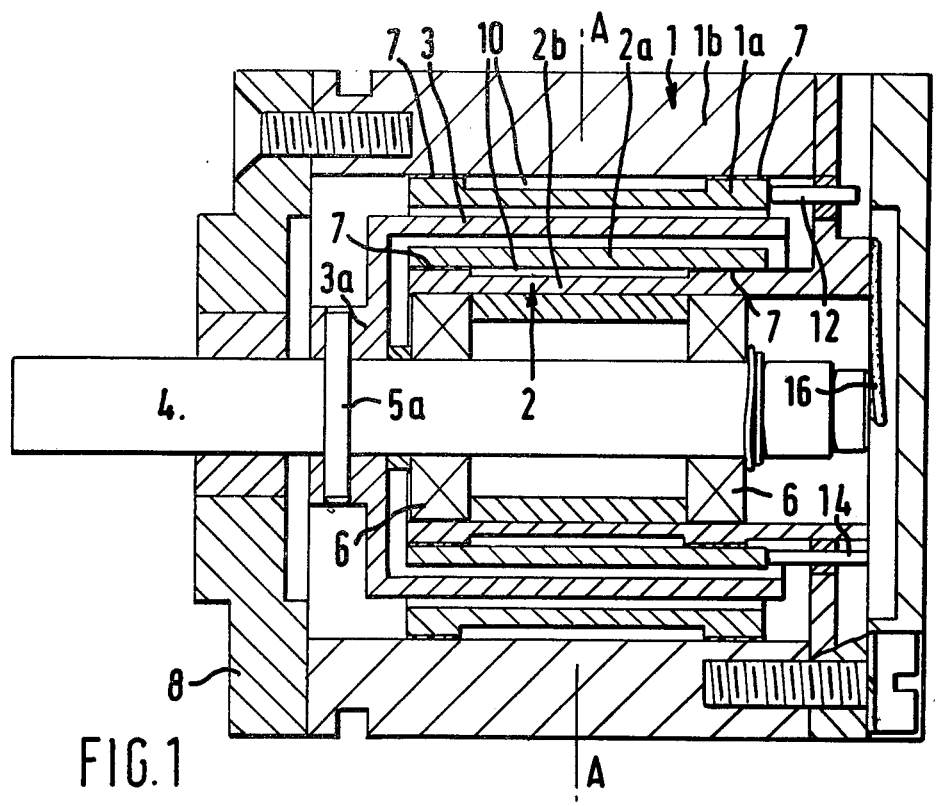

United States Patent [19]

Wolfendale

[11] 4,268,889

[45] May 19, 1981

[54] ROTARY DISPLACEMENT CAPACITIVE TRANSDUCERS

[75] Inventor: Peter C. F. Wolfendale, Bletchley, England

[73] Assignee: Automatic Systems Laboratories Limited, Bedfordshire, England

[21] Appl. No.: 45,456

[22] Filed: Jun. 4, 1979

[30] Foreign Application Priority Data

May 31, 1978 [GB] United Kingdom ............... 25932/78

[51] Int. Cl.³ ............................................. H01G 5/04
[52] U.S. Cl. ................................... 361/292; 361/278; 361/280
[58] Field of Search ............... 361/292, 294, 287, 280, 361/278, 330

[56] References Cited

U.S. PATENT DOCUMENTS

| 2,978,638 | 4/1961 | Wing | 361/292 X |
| 3,479,588 | 11/1969 | Makow | 361/292 X |
| 3,566,222 | 2/1971 | Wolfendale | 361/294 X |
| 3,702,957 | 11/1972 | Wolfendale | 361/292 X |
| 3,777,226 | 12/1973 | Luo | 361/287 |

Primary Examiner—E. A. Goldberg
Attorney, Agent, or Firm—Pollock, Vande Sande & Priddy

[57] ABSTRACT

A rotary displacement capacitive transducer for indicating the angular position of a shaft comprises first and second cylindrical electrodes each electrode having inner and outer conducting members connected together by insulative adhesive and a part cylindrical screen mounted to the shaft is disposed between the electrodes and rotated with the shaft to vary the capacitance between the electrodes. The surfaces of the conducting members define the capacitance of the transducer.

9 Claims, 2 Drawing Figures

ROTARY DISPLACEMENT CAPACITIVE TRANSDUCERS

The present invention relates to rotary displacement capacitive transducers adapted to indicate the angular position of a shaft, and has for its object to provide a rotary displacement capacitive transducer which is of robust construction yet is of simple manufacture and may be made in a small size, and which has a very low capacitance leakage to ground.

A rotary displacement capacitive transducer according to the invention comprises a first and a second electrode disposed face to face, a rotary screen movable relative to said electrodes in order to vary the capacitance between said first and second electrodes, said first and second electrode each comprising an inner conducting member coaxially positioned within an outer conducting member, said inner and outer members being mechanically connected together and insulated from one another by connecting means disposed between said inner and outer conducting members.

The first and second electrodes are each of cylindrical or arcuate form, and the inner conducting member of the second electrode and the outer conducting member of the first electrode form the electrode surfaces and are electrically connected to cables for connection of the transducer to an external circuit.

Preferably, said mechanical connecting means is an epoxy-resin adhesive, or any other suitable adhesive.

To further reduce the capacitance leakage to ground the confronting surfaces of the inner and outer conducting members are preferably cut-away or relieved over the greater part of their axial length so as to be spaced from each other, and the epoxy-resin adhesive is applied only at the two ends of each electrode. The cylindrical first or the second electrodes are divided into at least two axially-extending arcuate segments insulated from each other, these segments being individually connectible to an external circuit.

The screen is cylindrical, is attached to the shaft whose angular position is to be determined for rotation with said shaft between the cylindrical electrodes, and has one or a plurality of openings or "windows" so that the overall configuration of the screen is part cylindrical. The screen may be fabricated either of a conducting or an insulating material. Where the screen is conducting, it will be connected to ground potential, whereby a progressive reduction in capacity is caused as the screen moves between the electrodes. Alternatively, the screen may be of insulating dielectric material, which causes a progressive increase in capacity as the screen moves between the electrodes.

In use, the transducer may function as a differential transducer and be connected to form two capacitive arms of a normally-balanced bridge circuit, the degree of the bridge unbalance being indicative of the relative displacement of the screen, and therefore of the angular position of the shaft, with respect to the first and second electrodes.

Figure 2:
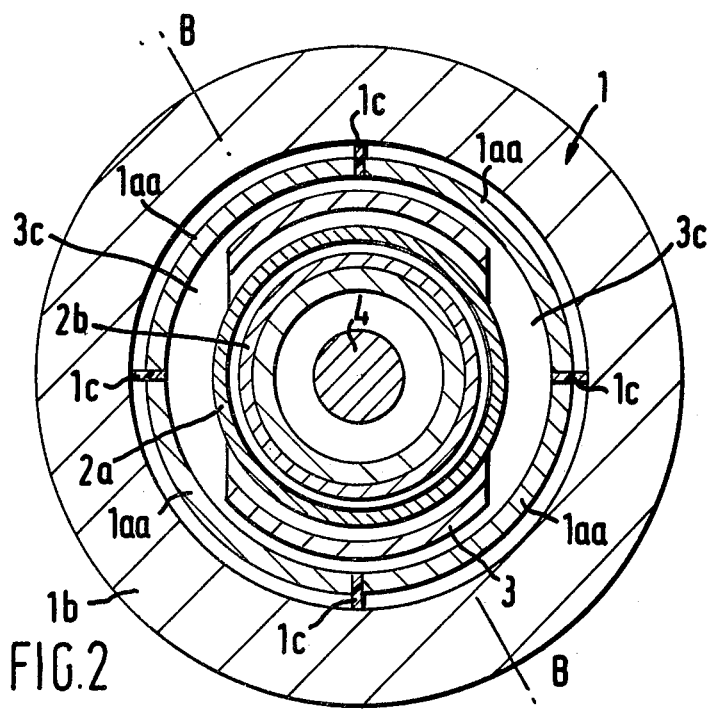

An embodiment of the invention is hereinafter described, by way of example, with reference to the accompanying drawings, in which:

FIG. 1 is an elevational view in cross-section of a transducer taken on line B—B of FIG. 2; and FIG. 2 is a cross-sectional view of the transducer taken on line A—A of FIG. 1.

Referring now to the drawings, a rotary displacement capacitive transducer according to the invention comprises a second cylindrical electrode 1, a first coaxially arranged cylindrical electrode 2, and a cylindrical screen 3, which may be coaxially arranged with electrodes 1, 2. The screen 3 has an apertured extension 3a at one end whereby it is clamped to a shaft 4 by a pin connection 5a (or any other suitable coupling such as welding or bonding), the shaft being supported by a pair of bearings 6 secured to the ends of the first electrode 2.

The second and first electrodes 1 and 2 are of sandwich-like construction, electrode 1 comprising inner and outer cylindrical conducting members 1a and 1b, and electrode 2 comprising inner and outer cylindrical conducting members 2a and 2b. The conducting members 1a, 1b, 2a, 2b are of steel or any other suitable material such as glass, ceramic with a conductive coating. As shown, the members 1a, 1b and 2a, 2b are connected together and insulated from each other by a layer of adhesive 7. To further reduce capacitance leakage to ground the adhesive layer 7 may be applied only at the ends of the electrodes 1 and 2 and the intervening confronting surfaces of the conducting members 1a, 1b and 2a, 2b may be cut-away or relieved as at 10 to provide a space therebetween.

The left-hand end of the transducer, as viewed in FIG. 1, is closed by a cylindrical end plate 8 connected to the outer surface of conducting member 1b. Electrical connectors 12 and 14 are connected, respectively, to conducting members 1a and 2b.

In this embodiment, the cylindrical conducting member 1a of the second electrode is divided into four arcuate segments 1aa, insulated from each other at 1c as shown in FIG. 2, each segment being connected to a separate connector 12. Shaft 4 is grounded by means of an electrical leaf spring connector 16.

The screen 3, which may be of conducting or insulating material, has two similar, symmetrically arranged rectangular shaped apertures or "windows" 3c which give the overall screen a part cylindrical configuration as illustrated in FIG. 2. In other constructions (not shown) more than two windows or only a single window may be provided. The windows may be of shapes other than rectangular. It is to be understood that when referring to the shape of the windows, the cylindrical surface of the screen is considered as being laid out in a developed form as a planar surface.

I claim:

1. A rotary displacement capacitive transducer comprising a first cylindrical electrode having a longitudinal axis, a second cylindrical electrode surrounding said first electrode and supported about said longitudinal axis to provide an annular gap between said first and second cylindrical electrodes, at least one of said cylindrical electrodes being divided into axially extending arcuate segments, means for insulating said segments from one another, and a part cylindrical screen mounted on a shaft rotatable about said longitudinal axis, said part cylindrical screen extending along and being movable about said longitudinal axis through said annular gap when said shaft rotates, the rotating movement of said part cylindrical screen being operable to vary a capacitance coupling between said inner and outer cylindrical electrodes whereby the capacitance of the capacitive coupling is indicative of the angular position of said shaft.

2. A rotary displacement capacitive transducer according to claim 1, in which said screen is formed of conductive material, and means electrically connected to said screen for maintaining said screen at a fixed potential.

3. A rotary displacement capacitive transducer according to claim 1, in which said first electrode is provided with an inner cylindrical conductive member which extends the length of the first electrode and which is mechanically connected to and insulated from said first electrode, said second electrode being provided with an outer cylindrical conductive member which is mechanically connected to and insulated from said second electrode, and means electrically connected to said inner and outer conductive members to maintain them at a fixed potential.

4. A rotary displacement capacitive transducer according to claim 3, in which said screen is formed of conductive material, and means electrically connected to said screen for maintaining said screen at a fixed potential.

5. A rotary displacement capacitive transducer according to claim 1, in which said at least one of said cylindrical electrodes is divided into four equal dimension, axially extending arcuate segments.

6. A rotary displacement capacitive transducer comprising a first cylindrical electrode having a longitudinal axis, an inner cylindrical conductive member extending the length of said first cylindrical electrode, said inner conductive member being mechanically connected to said first cylindrical electrode and insulated therefrom, a second cylindrical electrode surrounding said first cylindrical electrode and supported about said longitudinal axis to provide an annular gap between said first and second cylindrical electrodes, said second cylindrical electrode being divided into at least two axially extending arcuate segments insulated from each other, an outer cylindrical conductive member extending the length of said second cylindrical electrode, said outer conductive member being mechanically connected to said second cylindrical electrode and insulated therefrom, a screen mounted on a shaft rotatable about said longitudinal axis, said screen being of part cylindrical configuration and extending along and being movable through said annular gap about said longitudinal axis when said shaft rotates, the rotating movement of said part cylindrical screen being operable to vary a capacitive coupling between said first and second cylindrical electrodes whereby the capacitance of the capacitive coupling is indicative of the angular position of said shaft, and means electrically connected to said inner and outer conductive members to maintain them at a fixed potential.

7. A rotary displacement capacitive transducer according to claim 6, in which said screen is formed of conductive material, and means electrically connected to said screen to maintain said screen at a fixed potential.

8. A rotary displacement capacitive transducer according to claim 7, in which said means electrically connected to said screen and said means electrically connected to said inner and outer conductive members are arranged to maintain said screen and said inner and outer conductive members at the same fixed potential.

9. A rotary displacement capacitive transducer according to claim 8, in which said fixed potential is ground potential.

* * * * *